(Model.)

H. M. CRIDER.
FRUIT PICKER.

No. 249,460. Patented Nov. 15, 1881.

Attest,
W. H. H. Knight
Joseph Forrest

Inventor,
Henry M. Crider,
by Melville Church
his atty.

UNITED STATES PATENT OFFICE.

HENRY M. CRIDER, OF YORK, PENNSYLVANIA.

FRUIT-PICKER.

SPECIFICATION forming part of Letters Patent No. 249,460, dated November 15, 1881.

Application filed September 27, 1881. (Model.)

*To all whom it may concern:*

Be it known that I, HENRY M. CRIDER, of York, in the county of York and State of Pennsylvania, have invented certain new and useful Improvements in Fruit-Pickers; and I do hereby declare the following to be a full, clear, and exact description of the same, reference being had to the accompanying drawings, forming a part of this specification, in which—

Figure 1:
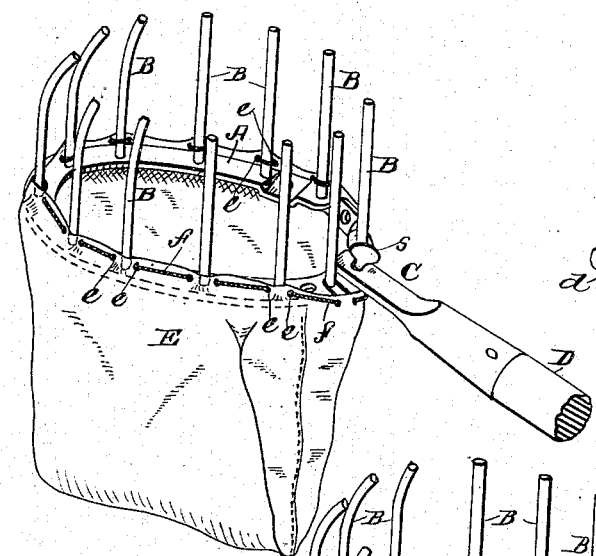
Figure 5:
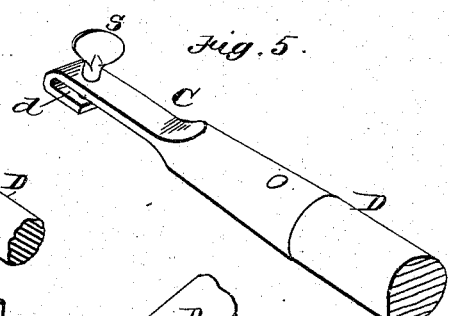
Figure 2:
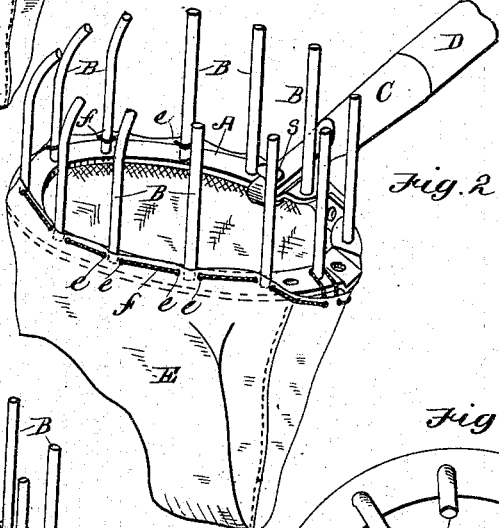
Figure 3:
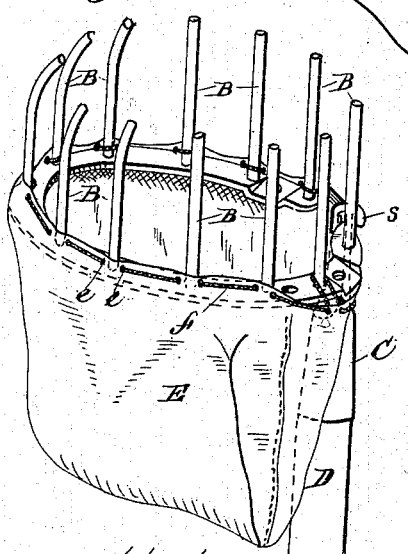
Figure 4:
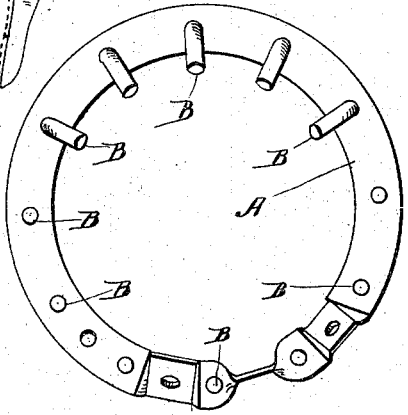

Figures 1, 2, and 3 are views showing the implement adjusted in different positions upon the handle. Fig. 4 is a front view, looking into the mouth of the sack or tube into which the fruit falls after being detached; and Fig. 5 is a view of the handle detached.

Similar letters of reference in the several figures denote the same parts.

My invention has for its object to provide a cheap and simple fruit-picking implement, by means of which fruit can be picked and secured without the slightest injury to it, with the greatest ease and facility, by an operator standing above, below, or on a level with the point where the fruit hangs; and to this end it consists of an implement of novel construction, which I will now proceed to describe.

In the drawings, A represents a ring of metal or other suitable material, preferably, however, of flat metal, having secured to and projecting from it a series of teeth, B, which are preferably rounded, so as not to cut or injure the fruit coming in contact with them. About one-half of these teeth project out straight from the ring at right angles, while the remainder are preferably curved inward toward the center of the ring, for the purpose of enabling them to secure a better hold upon the fruit to more readily detach it from the tree.

Co-operating with the flat ring A is a holding-iron, C, secured to one end of a handle or staff, D. This iron is constructed with a socket for the handle, as shown, and its extremity is provided with a hook formed by bending the metal backward parallel with the main part, so as to leave a slot, $d$, for the accommodation of the flat ring A. Perforations are made in both parts of the hooked end and also through the ring A, and through these perforations passes the shank of a thumb-screw, $s$, said thumb-screw thus serving the purpose of securing the parts firmly, though detachably, together.

The flat metal ring is turned or bent in different directions between the teeth, as shown, and each turned portion is also perforated. This enables the ring to be connected and secured to the hooked end of the iron at different angles, as occasion requires. The ring is secured in any suitable manner in the mouth of a bag or tube, E, of canvas or other flexible material suitable for forming the fruit-receiving receptacle. I preferably, however, insert eyelets $e\ e$ in pairs around the mouth of the bag and pass through them a string or cord, $f$, in such manner that said cord shall pass through first one eyelet of a pair, then around one of the teeth on the metal ring, and then back through the other eyelet of the pair, and so on way around the mouth of the bag. This constitutes a very simple mode of connecting the bag to the ring; but any other mode may be resorted to, if preferred. The outer edge of the inner circumference of the metal ring is preferably rounded or beveled off, so as to prevent it from cutting or injuring the fruit coming in contact with it.

It will be observed that, being enabled to attach the handle to the ring at various angles, the operator can pick fruit directly overhead or in an oblique direction, either upward or downward.

Sometimes it is desirable to pick fruit from a window, balcony, or roof higher than the tree, in which case the device can be so adjusted as to pick upward and secure the fruit readily in the sack. The various adjustments of the parts also make it particularly convenient to obtain fruit in various directions from the forks of a tree.

Instead of bending the ring to form the different angular attachments, separate projections may be formed with or attached to the metal ring and caused to project from the ring at various angles; but such arrangement I regard as an inferior equivalent for the bent ring. So, too, instead of the thumb-screw for locking the parts together, a spring-pin or other suitable arrangement may be employed.

In securing the fruit the curved teeth operate to detach the fruit, while the straight teeth direct it into the mouth of the bag. The bag or tube may be bottomless, if preferred, and made to extend all the way to the ground, in which case the fruit will be conducted directly to the ground or to an operator at the end of the tube, and the implement need not be lowered from among the branches of the tree until all the fruit is picked. I prefer, however, to make the bag with a bottom and of limited capacity.

The metal ring may be constructed round in cross-section, excepting where the handle-iron is to be attached, and there it should be flat.

I claim as my invention—

1. In a fruit-picker, the combination, with a toothed ring secured to the mouth of a bag or tube, of a handle and means for rigidly attaching the handle to the ring at different angles, substantially as described.

2. In a fruit-picker, a flat metal ring having the straight and curved teeth, and bent or turned and perforated through the turned portions, in combination with the iron having the perforated hooked end, and the thumb-screw, substantially as described.

HENRY M. CRIDER.

Witnesses:
SOLOMON MYERS,
HARRY P. MILLER.